Dec. 5, 1950        J. L. JUNKIN        2,532,847
FUEL CONTROL VALVE
Filed March 26, 1946
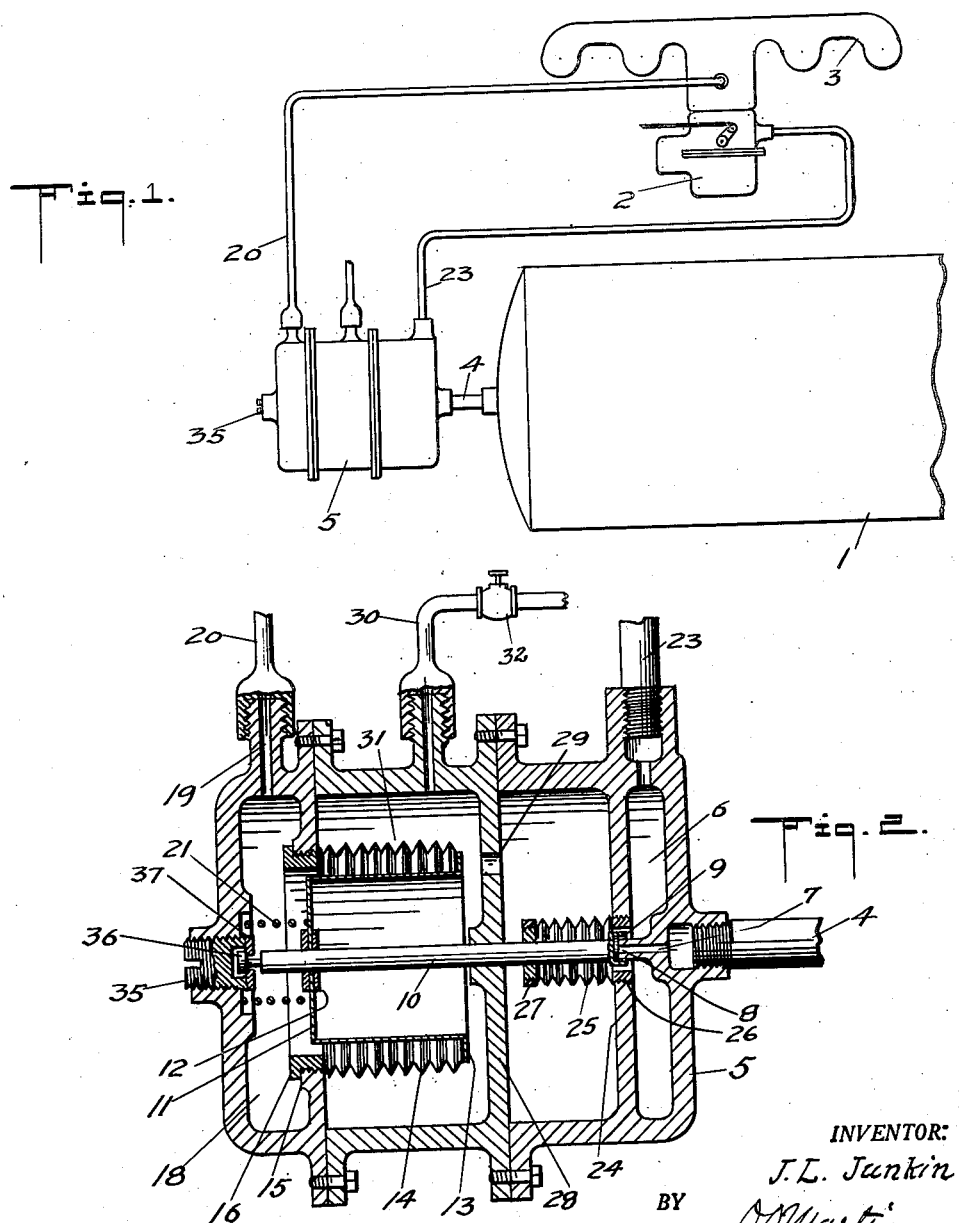
INVENTOR:
J. L. Junkin
BY
O. O. Martin
ATTORNEY.

Patented Dec. 5, 1950

2,532,847

UNITED STATES PATENT OFFICE 2,532,847

FUEL CONTROL VALVE

John L. Junkin, Los Angeles, Calif.

Application March 26, 1946, Serial No. 657,247

2 Claims. (Cl. 137—153)

This invention relates to internal combustion engines and has particular reference to a device for controlling the fuel supply to such engine.

It is the object of the invention to provide in the fuel supply line to the engine a valve mechanism controlled by intake manifold suction of the engine to admit fuel to the engine carburetor. Another object is to provide a device of the character referred to which is operable either by manifold suction, or by fuel pressure, where the fuel is pressure operated.

With these and other objects in view, the invention resides in the combinations hereinafter fully described and illustrated in the accompanying drawings, of which:

Fig. 1 is a diagrammatically arranged view of a fuel supply system embodying the invention; and Fig. 2 shows, on a larger scale, the more essential parts of the system.

The structure of the present invention is applied to supply fuel from a tank 1 to the carburetor 2 of an internal combustion engine. The carburetor may be of any commercial type and it is shown conventionally hung on the intake manifold 3 of the engine.

A supply pipe 4 leads from the fuel tank to the inner end of a casing 5 which, in a manner that will now be described, is divided into a series of compartments, the first of which is indicated by the numeral 6. A passage 7 leads into this compartment and the wall of the casing terminates in a valve seat 8 at the inner end of this passage, with which the pipe 4 communicates. A valve 9 is held normally in contact with the seat 8 and it is seated within a stem 10 which extends through the various compartments of the casing.

A thimble-shaped member 11 is suitably secured to the stem 10 at 12 and it terminates at the other end in a flange 13 to which one end of a bellows 14 is tightly secured. The other end of this bellows is suitably fastened to a lock ring 16 which is externally threaded to engage the screw threads of the casing flange 15 thereby to clamp it tightly in position. A chamber 18 is in this manner formed within the outer end of the casing between the bellows 14 and the member 11. In a lug of the casing is a passage 19 from this chamber, and a pipe 20 is seated on said lug to communicate with the intake manifold of the engine.

A spring 21 is seated between the outer wall of the casing and the closed end of the member 11 to maintain the valve stem 10 advanced to seat the valve. The result is that the valve remains closed while the engine is not running, but that suction through the manifold, when the engine is started creates a partial vacuum within the chamber 18, sufficient to compress the bellows and so to withdraw the valve from its seat, against the tension of the spring 21. Fuel from the tank may then pass through the chamber 6 and a pipe 23 to the carburetor.

The compartment 6 is by an annular partition 24 divided into two intercommunicating chambers, and a small bellows 25 is by a lock ring 26 tightly fitted into the passage through this partition. The other end of the bellows is similarly secured to a circular shoulder 27 of the valve stem, thereby to provide a floating air and fuel tight closure on this stem. It is preferable to provide a bearing for the valve stem intermediate the two bellows, and such bearing may form part of and be supported by a partition 28. Because the two bellows form air and fuel tight closures it is not necessary that this partition be made solid, but passages such as indicated at 29 may be placed therein for intercommunication between the spaces surrounding the bellows.

In cases where the fuel in the tank 1 is maintained under pressure, a conduit 30 for such pressure impelled fuel is in communication with the space 31 encompassing the bellows 14, and it is seen that pressure in this manner admitted to this space tends to compress the bellows and so to open the valve 9. A valve 32 is cut into the conduit 30 to control the flow therethrough.

A plug 35 is seated in screw threads at the outer end of the casing and this plug is recessed at the inner end thereof to receive a head 36 of the valve stem and an annular plate 37 is secured to the end of the plug to maintain this head confined within the recess. With the head of the stem in such manner anchored within the recess it is seen that the valve 9 may be adjusted relative to its seat by a simple rotation of the screw plug 35 thereby to regulate the flow of fuel to the carburetor.

I claim:

1. A device for controlling passage of fuel to a source of suction comprising, a cylindrical casing, partitions dividing the casing into axially aligned chambers, there being axially aligned passages through one end wall and the partitions of the casing, a fuel inlet conduit extending from said end wall passages across the adjacent chamber and freely into the passage through the inner wall of said chamber, an outlet fuel conduit from the chamber, said conduit terminating in a valve seat, a stem axially slidable in the partition passages and terminating in a valve in axial alignment with said seat, a bellows on said stem and on the inner wall of said chamber tightly closing the passage therethrough, the chamber at the opposite end of the casing having a passage communicating with the source of suction, a bellows secured to the inner wall of said second chamber and having its other end fastened to said stem, and resilient means urging movement of the stem and valve against said seat, suction through said passage causing contraction of said second bellows to move the stem against the tension of said resilient means thereby to open the valve.

2. A device for controlling passage of fuel to a source of suction comprising, a cylindrical casing, partitions dividing the casing into axially aligned chambers, there being axially aligned passages through one end wall and the partitions of the casing, a fuel inlet conduit extending from said end wall passages across the adjacent chamber and freely into the passage through the inner wall of said chamber, an outlet fuel conduit from the chamber, said conduit terminating in a valve seat, a stem axially slidable in the partition passages and terminating in a valve in axial alignment with said seat, a bellows on said stem and on the inner wall of said chamber tightly closing the passage therethrough, the chamber at the opposite end of the casing having a passage communicating with the source of suction, a bellows secured to the inner wall of said second chamber and having its other end fastened to said stem, resilient means urging movement of the stem and valve against said seat, suction through said passage causing contraction of said second bellows to move the stem against the tension of said resilient means thereby to open the valve, and means for adjusting the position of the stem and valve relative to the valve seat.

JOHN L. JUNKIN.

REFERENCES CITED

The following references are of record in the file of this patent:

UNITED STATES PATENTS

| Number | Name | Date |
|---|---|---|
| 1,148,922 | Pagano | Aug. 3, 1915 |
| 1,461,662 | Kawamura | July 10, 1923 |
| 1,585,479 | Fisher | May 18, 1926 |
| 1,898,287 | Bragg | Feb. 21, 1933 |
| 2,043,798 | Hyatt | June 9, 1936 |
| 2,111,430 | Lamar | Mar. 15, 1938 |
| 2,146,092 | Raymond | Feb. 7, 1939 |
| 2,406,854 | Samiran | Sept. 3, 1946 |